United States Patent [19]

Campbell

[11] 4,146,796
[45] Mar. 27, 1979

[54] APPARATUS FOR RADIATION SOURCE DEPTH DETERMINATION IN A MATERIAL

[76] Inventor: Patrick J. Campbell, P.O. Box 2395, Pleasant Hill, Calif. 94523

[21] Appl. No.: 779,088

[22] Filed: Mar. 18, 1977

[51] Int. Cl.² .......................... G21G 4/00; G01V 5/00
[52] U.S. Cl. ..................................... 250/493; 250/253
[58] Field of Search ............... 250/253, 308, 390, 391, 250/392, 493, 497

[56] References Cited

U.S. PATENT DOCUMENTS

| 2,916,628 | 12/1959 | Prest | 250/497 |
| 3,124,689 | 3/1964 | Shure | 250/497 |
| 3,372,281 | 3/1968 | Auld et al. | 250/497 X |
| 3,544,793 | 12/1970 | Bless et al. | 250/390 X |

Primary Examiner—Alfred E. Smith
Assistant Examiner—Janice A. Howell
Attorney, Agent, or Firm—Bielen and Peterson

[57] ABSTRACT

An apparatus for determining the depth of a radiation source within a body of material utilizing a radiation source holder moving the radiation source within the body. A plurality of switches have contacts that are fixed in relation to the movement of the radiation source within the material. Trigger means activates a particular switch at a preselected depth of the radiation source. Means for indicating the activation of a switch would thus produce a signal as a representative of the depth of the radiation source.

10 Claims, 7 Drawing Figures

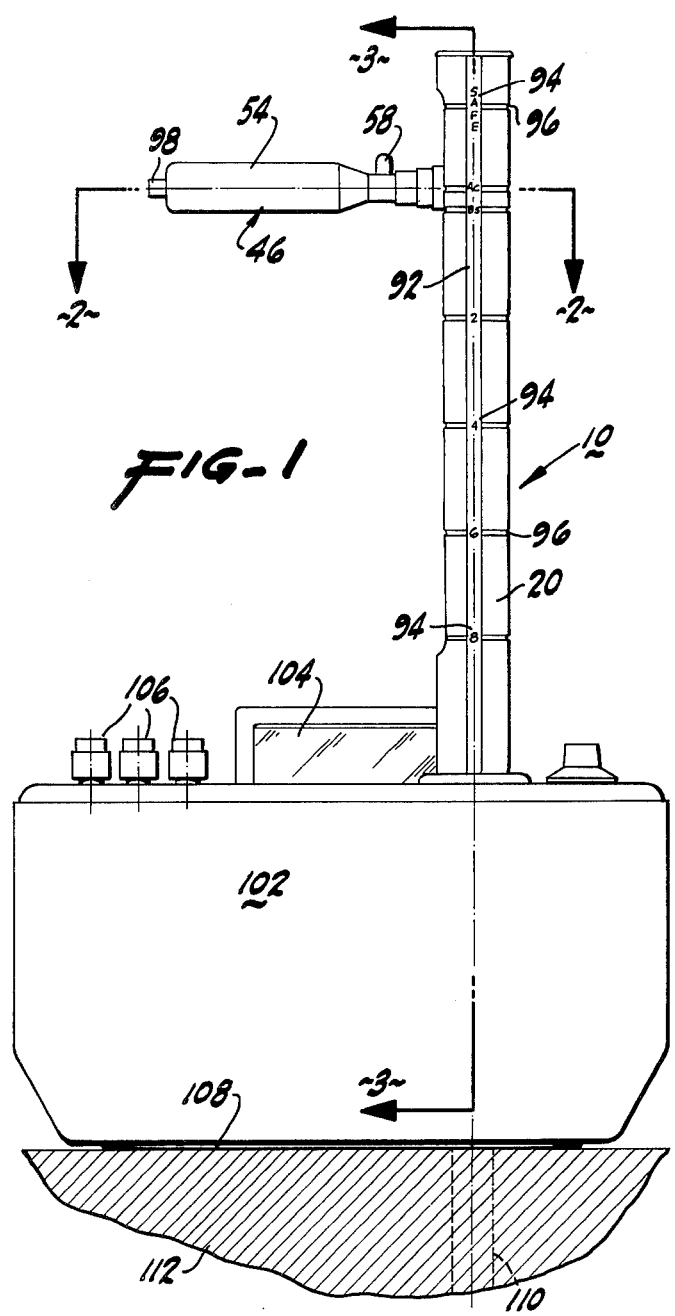
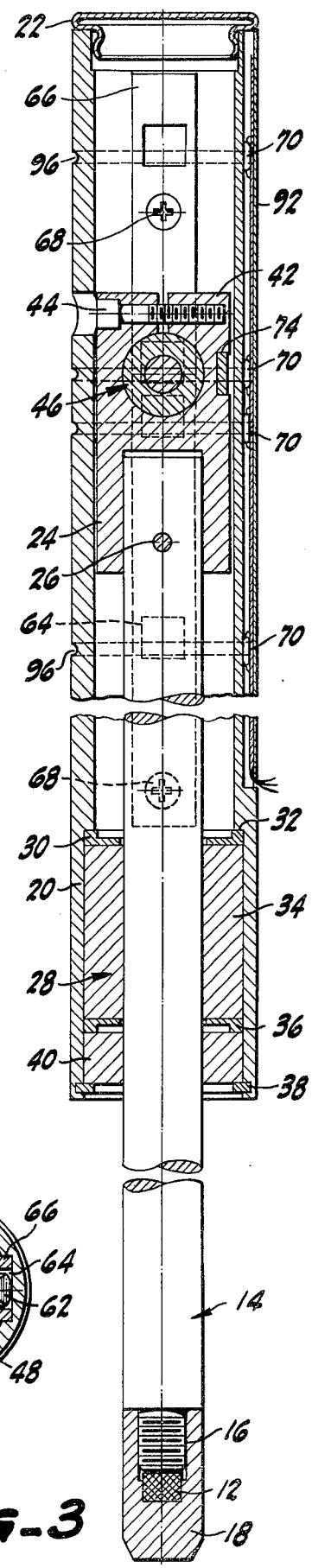
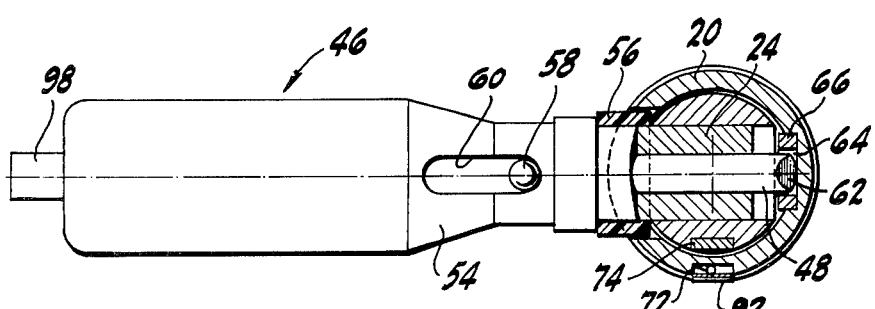

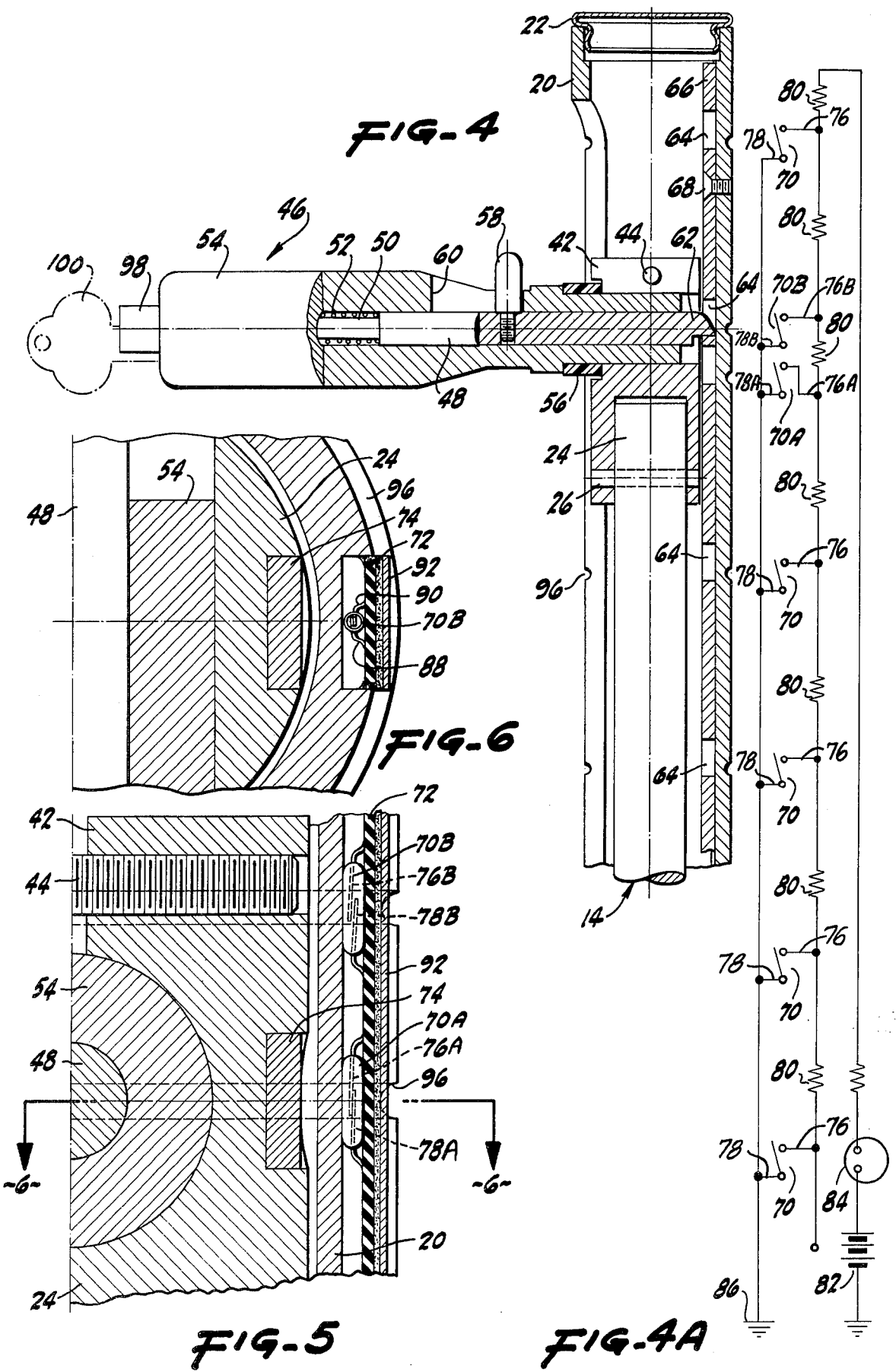

APPARATUS FOR RADIATION SOURCE DEPTH DETERMINATION IN A MATERIAL

BACKROUND OF THE INVENTION

The present invention relates to a novel apparatus to determine the depth of radiation sources within a body of material such as soil, for the purpose of determining density, moisture content, and the like of the material.

The measurement of soil density and soil moisture content is an important determination in the construction and agricultural industries. In the past, the method of obtaining such measurements has included the removal of the soil to a laboratory for testing. This technique is time consuming and not consistantly accurate since the sample removed may change its particular characteristics during transportation and handling.

Relatively recent developments have included the use of a radiation source such as radioactive materials available in the industry. Such radiation sources emit gamma radiation and neutrons which may be subsequently detected by backscatter and transmission techniques. Reference is made to U.S. Pat. No. 3,655,977, issued Apr. 11, 1972, which fully describes an apparatus which may be employed, without excessive handling, for either backscatter or transmission measurement techniques.

Focusing on the transmission technique, a pre-drilling of a small hole in the material is initially required. A source support, which may take the form of an elongated rod, is inserted within the hole a predetermined distance. A detector on the material surface would then gage the radiation signal, the intensity of which is proportional to the density of the soil. The transmission technique eliminates the problem of surface roughness which has a marked effect on the backscatter technique performed on the surface of the body of material being measured. However, the depth of the radiation source in the material must be exactly determined in order to produce accurate results. The advent of microprocessors requires that the depth determination be in the form of an electrical signal understandable by a computer. The work of the computer eliminates time consuming and costly human computations.

No prior devices are known which produce a depth determination of a radiation source within a body for use with a transmission technique for determining soil density.

SUMMARY OF THE INVENTION

In accordance with the present invention a novel apparatus for determining automatically the depth of a radiation source within a body material is provided.

The apparatus includes a radiation source holder to direct and to transport the radiation source within the body. In the case of the heretofore described transmission technique, the radiation source holder may be a rod which travels into a pre-drilled hole in the body. The rod may be enclosed in a guide tube having external visual indication of the rod's position within the body. The radiation source holder may mount on the detection means for convenient usage.

A plurality of switches are positioned such that the switch contacts are fixed in relation to the movement of the radiation source holder, and the radiation source thereon, within the hole in the body. Trigger means activates any of the switches at a preselected depth of the radiation source within the body of material. The trigger means may be attached to the rod holder, but in any case, the trigger means moves with the radiation source.

Means for indicating the activation of any of the plurality of switches would produce a signal corresponding to the depth of the radiation source. Such indicating means may take the form of a series of resistors electrically connected or linked to a source of power. The plurality of switches connect to an electrical ground; each of the switches being connected to the series of resistors. Means for detecting a signal produced by activation of any of the switches may take the form of an ammeter, galvanometer and like devices. Thus, a circuit forms by the electrical connection of the ground any of the plurality of switches, a certain number of the series of resistors and the power source. The current signal of the created circuit would serve as a representation of the depth of the radiation source.

The apparatus may employ magnetically activated switches while the trigger means would be embodied in a magnetic field source, such as, but not limited to, a permanent magnet. In this instance, the guide tube may interpose the plurality of switches without hindrance to the workability of the apparatus.

As may be surmized, a new and useful invention has been described and it is therefore an object of the present invention to provide an apparatus for determining the depth of a radiation source in a body of material which may be used with a portable moisture and density measuring device employing a radiation source in such determinations.

It is another object of the present invention to provide an apparatus for determining the depth of a radiation source in soils pertaining to construction and agricultural uses.

It is yet another object of the present invention to provide an apparatus for determining the depth of a radiation source in a body of material in terms of an electrical signal useable by a computer for automatically plotting parameters of the body of material, employing a radiation transmission attenuation technique.

It is still another object of the present invention to provide an apparatus for determining depth of a radiation source in a body of material to a high degree of accuracy for the purpose of obtaining highly accurate parameters of the body of material.

The invention possesses other objects and advantages especially as concerns particular features and characteristics thereof which will become apparent as the specification continues.

Various aspects of the present invention will evolve from the following detailed description of the preferred embodiments thereof which should be taken in conjunction with the accompanying drawings.

BRIEF DESCRIPTION OF THE DRAWINGS

FIG. 1 is a side elevational view of the apparatus in place on a material gage.

FIG. 2 is a slightly enlarged view taken along line 2—2 of FIG. 1.

FIG. 3 is a broken view taken along line 3—3 of FIG. 1.

FIG. 4 is a partially broken sectional view of the upper portion of the apparatus.

FIG. 4A is a schematic diagram showing the approximate arrangement of the plurality of switches.

FIG. 5 is a broken magnified sectional view of the magnetic switching of an embodiment of the apparatus.

FIG. 6 is a view taken along line 6—6 of FIG. 5.

DESCRIPTION OF THE PREFERRED EMBODIMENTS

The apparatus as a whole is shown in the drawings and designated by reference character 10. A radiation source 12, FIG. 3, positions in radiation source holder 14 which may take the form of an elongated rod. Holder 14 terminates at one end in a threaded pin which threadingly engages threaded opening 16 within end cap 18. Radiation source 12 may take the form of a soil gage source of radiation such as cesium 137 which is a known gamma radiation emitter. Likewise, radiation source 12 could be a neutron emitter such as Americium, Plutonium, or Radium mixed with Beryllium powder in a tightly compressed pellet, or a combination gamma radiation emitter and neutron emitter. Cap 18 may be constructed of stainless steel and source 12 may also take the form of a stainless steel capsule welded to the inner portion of end cap 18. Rod 14 fits within a guide 20. As shown in FIG. 3, rod 14 extends from the guide 20 a certain distance.

Guide 20 further includes crown or end cap 22 which serves to seal the inside of guide 20 at the end opposite the protrusion of rod 14. Rod 14 fits within junction block 24 and is held into place with roll pin 26, FIGS. 3 and 4A. The lower end of rod 14 slidingly engages sealing means 28, including seal 30. Beneath seal 30 lies bushing 34, which rests on seal 36. Expansion ring 38 and seal 36 sandwich bearing 40. Junction block 24 has a split portion 42 which is tightened by set screw 44. Junction block 24 supports latch means 46 therefrom, best illustrated by FIGS. 2 and 4 and externally visible in FIG. 1.

Latch means 46 affixes to junction block 24 and therefore may be used to move the rod 14 and radiation source into soil or like material. Latch means 46 embraces a latch 48, which includes a narrowed portion 50 surrounded by spring means 52. Handle 54 circumjacently disposes in relation to latch 48 and offers a bearing surface for spring means 52. Thus, latch 48 is urged toward the junction block 24. Ring 56 of resilient material, aids the fit of handle 54 within junction block 24. Set screw 44 firmly grips handle 54 within split portions 42 therewithin. Latch pin 58, within slot 60 threadingly couples to latch 48 and is movable therewith. Latch 48 includes a beveled tip 62 which slips into any one of a plurality of recesses 64 found in plate 66. Flat head screw 68, typical of a plurality of the same, fastens plate 66 to guide 20, FIGS. 3 and 4.

A plurality of switches 70 may be found adjacent to guide 20 on a strip 72, FIGS. 2 and 3. FIG. 4A depicts the arrangement of switches schematically at approximately the positions along guide 20 existent in the embodiment of the invention being described. Although many kinds of switches may be employed, the preferred embodiment shows magnetically activated switches 70 whose contacts 76, 78 are fixed in relation to trigger means 74 which take the form of a source of a magnetic field, such as a disc-shaped permanent magnet. Trigger means 74 is essentially fixed to radiation source holder 14 as shown. The magnetic switches 70 may be reed switches, type meti 1, manufactured by the Hamlin Company, Lake Mills, Wis. FIGS. 5 and 6 illustrate the operation of switches 70 by trigger means 74. The upper case letter A, B, etc. is used to identify individual switches of the type heretofore described by placing such upper case letter in conjunction with reference character "70." At a preselected position of radiation source 12, magnet 74 aligns with the magnetic arms 76A and 78A of switch 70A. Arm 78A, being more flexible than arm 76A, rotates to touch arm 76A Arms 76A and 78A constitute the electrical contact of switch 70A. Arm 78 is grounded while arm 76 leads to a series of resistors 80, FIG. 4A. A power source 82 feeds in the series connected resistors 80 through means 84 for detecting the signal produced therein. As shown in FIG. 4A, detecting means 84 takes the form of an ammeter 84, but could be any other electrical device known in the art. For example, the signal in the circuit formed by ground 86, any of the plurality switches 70, a selected number of resistors 80, and power source 82 may be fed into a computer for automatic calculation of soil density and moisture. It should be noted that switch 70B and its conductive arms 76B and 78B are shown in the open position on FIG. 5. Electrical conduits 88 and 90, FIG. 6, complete the connection of arms 76B and 78B to ground 86 and power source 82 via a selected number of resistors 80. As shown in FIG. 4A, the resistors 80 are interrupted by switches 70 such that the current signal produced in the heretofore described circuit would have a different value for each switch activation. It has been found that the accuracy of the switching arrangement herein discussed is about one hundredth of a centimeter. The magnetic arrangement of switches 70 also permits the enclosure of latch means 46 from the elements, and virtually eliminates the frictional contact of trigger means 74 with the switches 70.

A visual display of the position of the radiation source may be placed on the exterior of strip 72 in the form of label 92 having indicia 92 thereupon matched to horizontal crevices 96.

The apparatus 10 may further include a lock 98 and key 100 to prevent undesired movement of the radiation source 12, the key 100 shown in phantom on FIG. 4. Turning to FIG. 1, the apparatus 10 may be mounted in a housing 102 having a visual electronic display 104 and control knobs 106 thereupon. Housing 102 may also contain detection devices and computer means. The radiation source holder 14 and radiation source 12 would pass through a hatch (not shown) at the lower portion 108 of housing 102, and into a hole 110 in the body of material 112. The material 112 may be soil, clay, asphault, and other materials capable of penetration by the radiation source holder 14.

In operation, the user drills a hole 110 in the material 112 and places the apparatus 10 in housing 102 immediately above the hole 110. Handle 54 is grasped and latch pin 58 is pulled away from guide 20 within groove 60. Latch 48 and its beveled tip 62 move in the direction of the latch pin 58. Thus, the beveled tip 62 removes from any recess 64 within guide 20. The radiation source holder 14 and radiation source are free to move vertically. When such movement is into hole 110 the source may be placed at a certain depth within the hole 110. The alignment of trigger means 74 with a particular switch 70 would activate a switch 70 and signal detecting means 84 that the radiation source is at a certain depth within material 112.

While in the foregoing specification embodiments of the invention have been set forth in considerable detail for purposes of making a complete disclosure of the invention, it will be apparent to those skilled in the art that numerous changes may be made in such details without departing from the spirit and principles of the invention.

What is claimed is:

1. An apparatus for determining the depth of a radiation source within a body of material and transforming the same into a signal for computer usage comprising:
   a. radiation source holder transporting the radiation source within the body;
   b. plurality of switches having contacts which are fixed in relation to the movement of said radiation source transported by said radiation source holder;
   c. trigger means for indicating the activation of any of said plurality of switches, corresponding to preselected depths of the radiation source within the body; and
   d. means for indicating the activation of any of said plurality of switches, said indicating means producing a characteristic signal determinative of the activation of any of said plurality of switches which corresponds to the depth of the radiation source within a body and including detection means for distinguishing said characteristic signals and associating the same with the activation of any of said plurality of switches.

2. The device of claim 1 in which said trigger means produces a magnetic field and said switches are activated by said trigger means magnetic field.

3. The apparatus of claim 2 in which said trigger means is affixed to said radiation source holder and is movable therewith.

4. The apparatus of claim 3 in which said apparatus additionally includes means for guiding said radiation source holder within the body.

5. The device of claim 4 in which said guiding means interposes said trigger means and said plurality of switches.

6. The device of claim 1 in which said indicating means comprises a series of resistors electrically linked to a source of power, said plurality of switches connected to an electrical ground, each of said plurality of switches connected between each of said resistors, and said means for distinguishing said characteristic signals produced by the circuit formed by said ground, any of said plurality of switches, a selected number of said series of resistors and said power source.

7. The device of claim 6 in which said trigger means is affixed to said radiation source holder and is movable therewith.

8. The device of claim 7 in which said apparatus additionally includes means for guiding said radiation source holder within the body.

9. The device of claim 8 in which said guiding means interposes said trigger means and said plurality of switches.

10. The device of claim 9 in which said trigger means produces a magnetic field and said switches are activated by said trigger means magnetic field.

* * * * *